United States Patent [19]
Cianci

[11] 3,878,545
[45] Apr. 15, 1975

[54] REFLEX MEMBER HOLD-DOWN MECHANISM
[75] Inventor: Arthur Cianci, Norwood, Mass.
[73] Assignee: Polaroid Corporation, Cambridge, Mass.
[22] Filed: Apr. 30, 1973
[21] Appl. No.: 355,685

[52] U.S. Cl............................. 354/152; 354/158
[51] Int. Cl. .......................................... G03b 19/12
[58] Field of Search .......... 95/42, DIG. 2; 354/152, 354/158

[56] References Cited
UNITED STATES PATENTS
2,579,247  12/1951  Angenieux............................. 95/42
3,685,416  8/1972  Coughlin................................ 95/42
3,760,703  9/1973  Blinow................................... 95/42

Primary Examiner—Samuel S. Matthews
Assistant Examiner—E. M. O'Connor
Attorney, Agent, or Firm—Michael Bard; John S. Vale

[57] ABSTRACT

An improved override and hold-down mechanism for use with a reflex camera of the type incorporating a four bar linkage for effecting movement of a reflex member between viewing and exposure positions. The override mechanism includes a ramp surface configured to multiply the hold-down torque generated by a pair of override springs and secures the reflex member in the veiwing position against inadvertent movement.

7 Claims, 9 Drawing Figures

REFLEX MEMBER HOLD-DOWN MECHANISM

BACKGROUND OF THE INVENTION

The present invention relates generally to self-processing photographic cameras of the reflex type and, more particularly, to a reflex camera in which a specular surface is moved into the optical path of a taking lens when the camera is caused to assume an exposure mode configuration.

Certain photographic film materials are structured to directly record a positive image of any subject properly imaged and exposed thereon. Exemplary of such materials are the film units described in U.S. Pat. No. 3,415,644, entitled "Novel Photographic Products and Processes" and issued to E. H. Land on Dec. 10, 1968. Film units of this type are intended for use within the above-noted self-processing photographic cameras and incorporate all of the materials necessary to produce a positive photographic print immediately following their exposure. While being of a somewhat complex chemical makeup, the film units are physically structured to include a planar photosensitive element in laminar combination with a transparent image-receiving element. Specially packaged processing units are additionally included within the unit.

To image properly through a lens system upon the above-described film units, it is necessary that one or an odd number of specular surfaces be incorporated within the optical path extending from the camera lens to the exposure plane of the film unit. Although the film units are ocnfigured to provide a desirably large film format, certain improved photographic camera designs have taken advantage of the requisite specular surface to achieve somewhat compact overall camera structures.

Improved photographic cameras as above described are intended to perform in fully automated fashion while being structured so thinly and compactly as to be carried conveniently in the pocket of a garment. Typically, these improved cameras incorporate an optimum viewing and focusing system together with fully automatic exposure control and motorized automatic film processing. In effect, the fully automatic camera represents an instrumentality incorporating a complex, multi-step process control system.

For purposes providing optimum viewing performance as well as structural compactness, the automated camera preferably utilizes a form of single lens reflex viewing. As described and claimed in U.S. Pat. No. 3,672,281, entitled "Reflex Camera," and issued to E. H. Land on June 27, 1972, such reflex cameras normally assume a viewing-focusing mode configuration in which their exposure plane is isolated from scene illumination by a flat movable operaror or mirror and viewing surface assembly. In a viewing configuration, the operator assembly serves a function of providing a surface upon which a scene, in reflex fasion, may be framed and focused in preparation for a photographic exposure. In accordance with a modified single lens optical operation, depression of a start button on the camera commences a multi-step control causing its components to assume an orientation securing an exposure chamber by closing its shutter through an electromagnetic drive system. When this chamber is secured, the camera is caused to commence an exposure mode operation in which the earlier-described operator assembly is released for movement via a spring drive to uncover the exposure plane and provide a revised reflex optical path for subsequent exposure of the previously imaged scene.

As an exposure mode configuration is achieved, the automatic exposure control sub-system of the camera cycles through a regulated exposure interval following which the shutter again closes to secure the exposure chamber. The control system of the camera is then called upon to cock the operator assembly by driving it, via an electrical motor, into its viewing mode configuration. Prior to termination of the photographic cycle, an exposed photosensitive film unit is automatically removed from its position at the exposure plane and drawn through a motor-driven processing station. When the operator assembly has been cocked and returned to its orientation covering the exposure plane, the shutter is again opened to its maximum extent and the camera is ready for its next succeeding photographic cycle.

As mentioned previously, the operator assembly is cocked by driving it via an electrical motor into its viewing mode configuration. As a consequence, the operator assembly drive system will usually require an override form of drive linkage to assure proper seating at its cocked position. Such override feature is extremely difficult to incorporate within the confined housings of compact cameras without resorting to the use of relatively high-torque rate drive springs with their attendant undesirably high loads on the relatively small drive motor.

If the operator assembly encounters any interference during its movement toward its cocked or viewing-focusing mode position, the motor may be overloaded and damaged. Certainly, if the motor is overloaded enough, the power drain upon a power supply such as a battery may render it incapable of carrying out other functions during a given photographic cycle.

In dealing with some of the foregoing problems, certain novel photographic cameras such as described in copending application, Ser. No. 246,854, filed Apr. 24, 1972, and commonly assigned herewith, incorporate a lost-motion connection within the drive system for moving the operator assembly between the exposure mode position and the viewing mode position. Movement of the operator assembly between these positions is accomplished through a system incorporating a four bar linkage and drive spring means. The system is configured to minimize the time required for moving the operator assembly to its exposure mode position whilst also minimizing the elastic rebound of the operator assembly when it reaches its exposure mode position.

A torsion spring and tension spring adapted to deliver a substantially uniform torque are employed for moving the operator assembly to its exposure mode position. The springs are preloaded to minimize the operator assembly movement time and also reduce its elastic rebound upon reaching the exposure mode position. This is achieved by maximizing the residual torque of the drive springs at the exposure mode position of the operator assembly.

A pair of preloaded override tension springs are provided within the drive system and serves to provide an override or lost-motion connection between the motor and the operator assembly. If the operator assembly encounters any interference during its motor-driven movement between the exposure and viewing mode positions, the override springs will allow the motor to finish its normal return cycle. The energy from the motor will be transferred to and stored in the override springs until such time as the interference is removed. When the interference is removed, the override springs return the operator assembly to its viewing position and any overload or attendant damage to the motor will be eliminated.

The employment of the override springs insures proper positioning and seating of the reflecting member at its viewing position where it protects the unexposed photosensitive material. However, the problem of properly protecting the photosensitive material reoccurs if the camera is abused or roughly handled. Should the camera be sharply jostled or bounced, the override springs may not be of sufficient strength to retain the reflecting member in its film protecting position. As a result, ambient light may reach the uncovered film unit and cause either partial or total exposure of the film unit. Accordingly, some method of assuring proper film protection during this period would be most desirable. Such a method should not interfere with normal camera operation and ideally should only be operational during periods of unusual stress.

Copending application Ser. No. 222,964, filed on Feb. 2, 1972, in the name of I. Blinow, and entitled "Reflex Camera with Mirror latch," is addressed to a latching arrangement for use within a photographic apparatus employing a reflecting member movable to convert an optical path between viewing and exposure configurations. The latching arrangement both establishes latching association with the reflecting member for securing the same at a seated viewing position and is movable out of latching association at the commencement of a photographic cycle for permitting the release of the reflecting member.

Providing a safety feature, the latching arrangement assures that the reflecting member is retained in its seated viewing position should the camera be jostled or bounced. The latching arrangement thus serves to assure that film units within the camera are not inadvertently exposed. The latching association is discontinued during an initial phase of a photographic cycle to permit release of the reflecting member for spring driven movement toward its exposure position.

A motorized control mechanism forming part of the camera's control system operates to release the reflecting member for the noted spring-driven movement. Following a photographic exposure, the motorized control mechanism returns and cocks the reflecting member at its seated viewing position. Latching association is only then reestablished as the photographic cycle ends.

A lost-motion linkage is operatively associated between the reflecting member and motor drive for permitting an incremental amount of motor operation following the return of the reflecting member to its viewing position. An overtravel spring, formed as part of this lost-motion linkage assembly, operates as an energy storing element during the continued operation of the motor. This stored energy within the overtravel spring is employed to retain the reflecting member in its viewing position. Should the overtravel spring be of insufficient strength to retain the reflecting member in its viewing position during camera abuse, the latching arrangement remains operative to do so.

It has been found, however, that a latching arrangement such as described in application Ser. No. 222,964, aforesaid, is subject to malfunction due to the complexity of its assembly.

The latching means includes a timing gear within the motor control mechanism to which a profile cam is secured. An actuator member is spring biased into engagement with the profile cam and, in turn, drives a latch member which is slideably carried by the camera frame and is capable of engaging a docking assembly.

Obviously, the complex interaction of such a member of components is not only susceptible to operating malfunction, but there is the added complication and expense of assembly in addition to parts cost.

SUMMARY OF THE INVENTION

The subject invention includes a camera of the single lens reflex type having a planar wall which fixedly secures a specular member interposed between a lens and a film plane. The invention further includes an operator assembly incorporating a reflex member having opposed reflecting surfaces. One of these reflecting surfaces functions to reflect the image of a subject to the film plane and the other of these reflecting surfaces functions as a reflective viewing screen.

The operator assembly is mounted for pivotal movement between a first position wherein the viewing screen is positioned at a focal plane overlying and proximate the film or exposure plane and a second position wherein the reflecting surface opposite the viewing surface is positioned overlying the fixed specular surface so as to redirect an image toward said film or exposure plane. Thus, in the first position said reflex member functions as a component of the camera's viewing system, and in the second position it functions as part of the exposure system.

Spring means are employed for moving the operator assembly from its viewing mode position to its exposure mode position. The spring means are operatively connected to the operator assembly via a unique four bar erecting linkage which functions to apply the proper driving torque to the operator assembly whilst minimizing any warpage of said operator assembly which might otherwise result from direct coupling with the spring drive means. Upon the completion of a photographic exposure, the operator assembly is returned to its viewing mode position via an electric motor which causes energy to be stored by said spring drive means whilst said operator assembly is returning to said viewing mode position.

A pair of preloaded tension springs are provided within the drive system connected between two of the links of said four bar linkage so as to serve as override springs to insure that the operator assembly is fully seated in its viewing-focusing position by allowing the motor to remain energized for a select interval following the seating of the assembly. The override springs absorb the resultant overtravel motion and bias the assembly into its viewing mode position. This permits reduced manufacturing tolerances, as aforesaid. Secondly, the manner of connection of the preloaded tension springs between said two links permits said links to move relative to one another so as to provide an override or lost-motion connection between the electric motor and the operator assembly. If the operator assembly encounters any interference during its motor-driven movement between the exposure and viewing mode positions, the override springs will allow the motor to finish its normal return cycle.

One of the links of the four bar linkage includes a bifurcated end portion which includes a ramp surface that engages another of said links. When the operator assembly reaches the viewing mode position, the continued energization of the motor will cause the ramp to greatly increase the effective loading of the override springs whereby a sufficient hold-down torque will be applied to said operator assembly to insure that the film plane remains covered irrespective of possible inadvertent jostling or bouncing of the camera. Thus, inadvertent exposure of unused film units will be prevented.

In view of the foregoing, it is an object of the subject invention to provide a photographic camera of the single lens variety and incorporating a reflex member which functions as a component of both the viewing and exposure systems of said camera and which includes means for preventing inadvertent exposure of film units when said member is in said viewing position.

Another object of the present invention is to provide a driving mechanism for moving a reflex operator assembly between a first position to a second position and incorporating means for both minimizing the effect on said mechanism of an obstruction in the path of said reflex operator assembly and securing said operator assembly in said first position against inadvertent bouncing or jarring.

Still another object of the instant invention is to provide a single lens reflex camera incorporating means for moving a reflex member between a viewing mode position and an exposure mode position and incorporating means for providing an enhanced hold-down torque for securing said reflex member in said viewing mode position to thereby prevent inadvertent exposure of a film unit.

A further object of the present invention is to provide a reflex photographic apparatus including an operator assembly movable between viewing and exposure mode positions and incorporating an improved hold-down mechanism for biasing said assembly in said viewing mode position sufficient to prevent inadvertent movement out of said viewing mode position.

A still further object of the instant invention resides in the provision of a novel spring and linkage assembly for moving a reflex member between first and second positions and both providing a lost-motion connection to accommodate an interruption in the movement of said member and an enhanced hold-down torque for securing said member in said first position against inadvertent movement.

DESCRIPTION OF THE DRAWINGS

Other objects and many of the attendant advantages of the instant invention will become better appreciated and said invention will become clearly understood by reference to the following detailed description when considered in conjunction with the accompanying drawings illustrating one embodiment of the subject invention, wherein.

Figure 1:
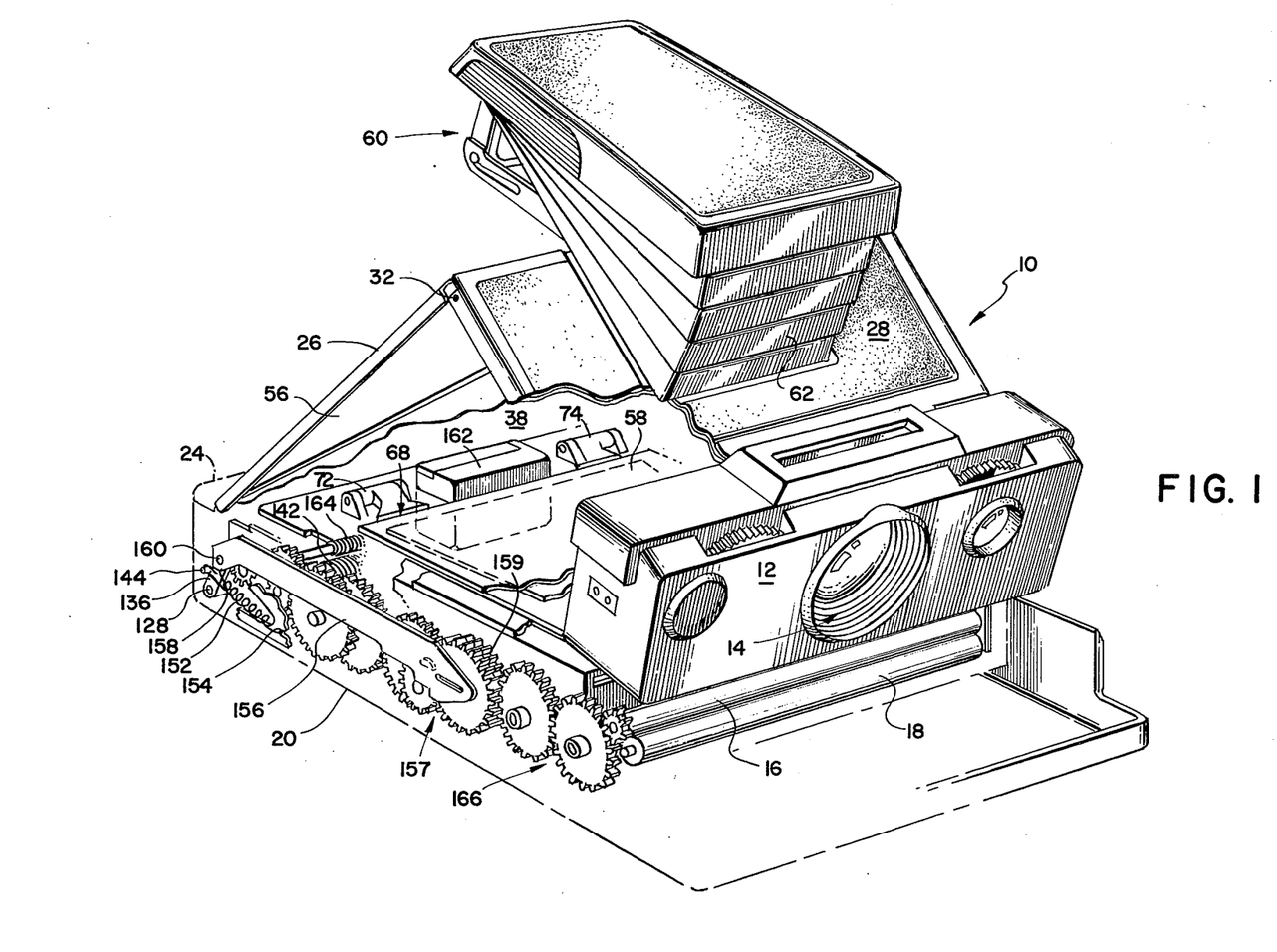
FIG. 1 provides a simplified perspective of a reflex photographic camera incorporating the subject invention.
Figure 2:
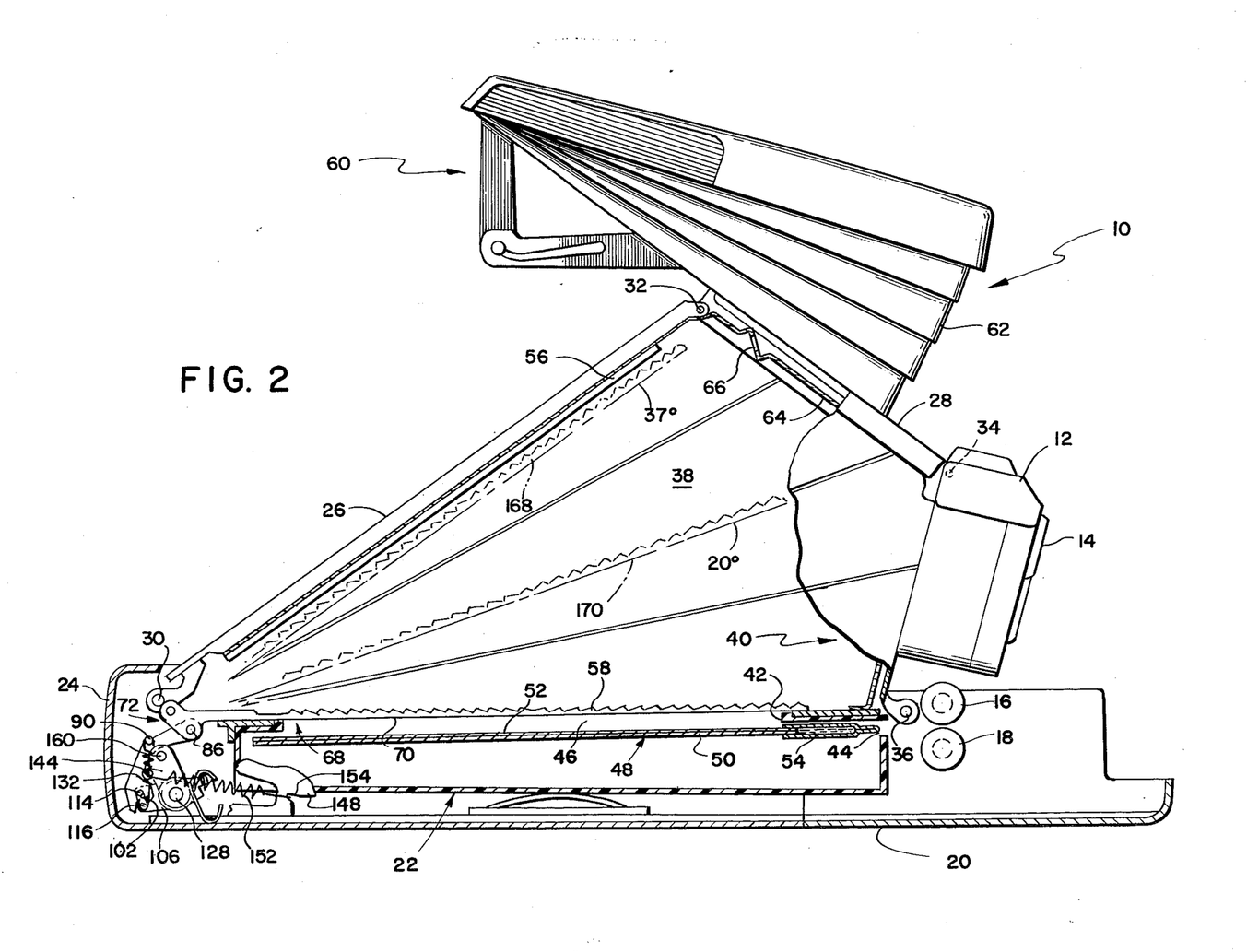
FIG. 2 provides a simplified side elevation of the reflex photographic camera of FIG. 1.

Referring to the drawings in more detail and, more particularly to FIGS. 1 and 2, a photographic camera of the single lens reflex type is illustrated generally at 10 and is similar to the cameras which are the subject of U.S. Pat. No. 3,672,281, aforesaid. The camera 10 is provided with a forwardly disposed exposure control system housing 12 within which are mounted all of the components required to regulate light passing into the camera. These components include, but are not limited to, an objective lens assembly illustrated generally at 14, a shutter mechanism (not shown), and electronic control circuitry (not shown). A pair of film unit processing rolls 16 and 18 are provided within said camera 10 for properly processing an exposed film unit in a now well-known manner.

The photographic camera 10 if further provided with a bottom support portion 20 which serves as a receiving and retaining chamber for a film-laden cassette structure as at 22. The bottom support portion 20 extends to a rear wall portion 24 which extends upwardly to an elongated upper rear portion 26 which, in turn, extends to an elongated upper forward portion 28. The portions 20, 24, 26, and 28, and the housing 12 are pivotally interconnected as at 30, 32, 34, and 36 for movement between the extended position shown and a compact folded position (not shown). The portions 20, 26, and 28, and the housing 12 cooperate with each other in the extended position to define essentially four sides of a generally six-sided exposure chamber 38, the remaining two sides of the chamber 38 being closed by a flexible bellows 40 formed of any suitable opaque material.

The film-laden cassette structure 22, positioned overlying the bottom support portion 20 of the camera 10, is formed as a generally thin parallelepiped having a top open portion, the rectangular periphery of which is defined by an integrally formed ridge 42. The forwardmost facing side of the cassette structure 22 is formed incorporating an opening or slot 44 generally aligned with the line of tangency between the processing rolls 16 and 18.

The cassette structure 22 is removably insertable within a cassette receiving chamber at the bottom support portion 20 so as to consistently and accurately orient an exposure plane 46 established at the lowermost periphery of the film frame opening defined by the ridge 42. A detailed disclosure of mechanisms for supporting cassettes such as the cassette 22, as at the bottom support portion 20 within the camera 10, is contained in U.S. Pat. No. 3,683,770, issued on Aug. 15, 1972, to E. H. Land and A. H. Bellows, and commonly assigned herewith.

Coincidentally situate at the exposure plane 46 is an uppermost one of a plurality of film units 48 (only one of which is shown). As described in more detail in U.S. Pat. No. 3,415,644, aforesaid, each of the plurality of film units 48 includes all of the materials necessary to produce a positive photographic print. Each of the plurality of film units 48 is physically structured to include a photosenstive element 50 positioned adjacent and in laminar relationship with an image-receiving element 52. The image-receiving element 52 is located upwardly from the element 50 and is urged by spring means (not shown) into the exposure plane 46.

A rupturable container 54 of processing fluid is secured to one end of the laminar assembly of the elements 50 and 52 and is located forwardly within the cassette structure 22. The rupturable container 54 dispenses its processing fluid between the elements 50 and 52 when subject to appropriate compressive pressure by the processing rolls 16 and 18. Each of the plurality of film units 48 is adapted to be processed when advanced, rupturable container 54 foremost, through the slot 44 and between the pressure-applying processing rolls 16 and 18. The latter manipulation causes the rupturable container 54 to dispense its fluid contents between the elements 50 and 52 and to spread the fluid between and in contact with said elements 50 and 52.

The image-forming process is now well known in the art and involves a formation of transverse image-forming substances in the exposed photosensitive element accompanied by their diffusion in a manner forming a visible, positiove image.

In the illustrated one of the film units 48, and as described in said U.S. Pat. No. 3,415,644, the processing fluid includes an opacifying agent which is spread as a layer between the photosensitive element 50 and the image-receiving element 52. The opacifying agent is opaque to actinic radiation and provides a background for the photosensitive transfer image evolved in the process.

The components of the camera 10 normally assume a configuration for operating in a focusing or viewing mode. During a photographic cycle, however, these components are reoriented to assume an exposure mode configuration. As best seen in FIG. 2, the components of the camera 10 are illustrated in solid line as they assume a focusing mode configuration. In this configuration, the objective lens assembly 14 focuses light from a subject along an optical path which extends from the objective lens assembly 14 and across the exposure chamber 38 of the camera 10 until it impinges upon and is reflected from a stationary reflex mirror 56.

The stationary reflex mirror 56 is fixedly secured to the elongated upper rear portion 26 of the camea 10 within the exposure chamber 38. The light reaching said stationary reflex mirror 56 from the objective lens assembly 14 is reflected from said mirror 56 and the optical path courses to a viewing surface indicated generrally at 58. The viewing surface 58 is reflective to light and reflects the light impinging thereon back to the upper portion of the stationary reflex mirror 56.

The camera 10 is provided with viewfinder apparatus indicated genrally at 60 and which is secured to the elongated upper forward portion 28 of the camera 10 in a well-known manner. The viewfinder apparatus 60 is adapted for movement between folded and extended positions, and includes first and second optical elements (not shown), operatively associable for providing an image of a scene. The optical elements are mounted for movement relative to one another between operative viewing positions and inoperative storage positions. A collapsible shade 62 cooperates with the other components of the viewfinder apparatus 60 to reduce the admission of ambient light between said first and second optical elements when they are located in their respective operative viewing positions. For a more complete understanding and description of the viewfinder apparatus 60, reference may be had to copending application Ser. No. 141,554, filed May 10, 1971, and entitled "Folding Camera."

A baffle plate 64 is secured within the camera 10 in a well-known manner adjacent the exposure chamber 38 and is provided with an aperture 66 which communicates between the exposure chamber 38 and the viewfinder apparatus 60, whereby any light reaching the viewfinder apparatus 60 from the exposure chamber 38 of the camera 10 must pass through said aperture 66.

The aperture 66 is so positioned that the mean optical path courses from the upper portion of the stationary reflex mirror 56 through said aperture 66 into the viewfinder apparatus 60 which, in turn, forms a real, erect, unreverted image of a subject.

With the arrangement above describe, the photographic camera 10 may be focused by adjusting the objective lens assembly 14 whilst simultaneously viewing the image on the viewing surface 58 from the viewfinder apparatus 60. With this viewing-focusing mode of operation, the optical path may be considered to have a predetermined length and the objective lens assembly 14 may be considered to establish a focal plane which, when the camera is in a viewing-focusing mode, lies in coincidence with the viewing surfacd 58. For a more complete understanding of the optics of the viewing system herein described, reference may be had to copending application Ser. No. 264,933, filed June 21, 1972, and entitled "Reflex Camera and Viewing Device", which reveals a somewhat similar system which functions in an analogous manner.

The viewing surfac 58 is mounted upon, or formed as an integral component of, an operator assembly shown generally at 68 and said surface 58 is preferably somewhat smaller than, but with the same shape as, the film format at the exposure plane 46. If the viewing surface 58 has the same shape as the film format, it aids in framing the subject; having the surface 54 slightly smaller than the film format, reduces the chances for accidentally cutting off a portion of the subject by a minor framing error.

Formed of a material opaque to light, the operator assembly 68 is of generally planar configuration and is dimensioned to nest over the cassette structure 22. As a consequence of its configuration, the operator assembly 68 functions to light seal or cap the exposure plane 46 at which the uppermost one of the plurality of film units 48 is situate.

The operator assembly 68 is provided with a specular reflex mirror 70 on its surface opposite the viewing surface 58.

Figure 3:
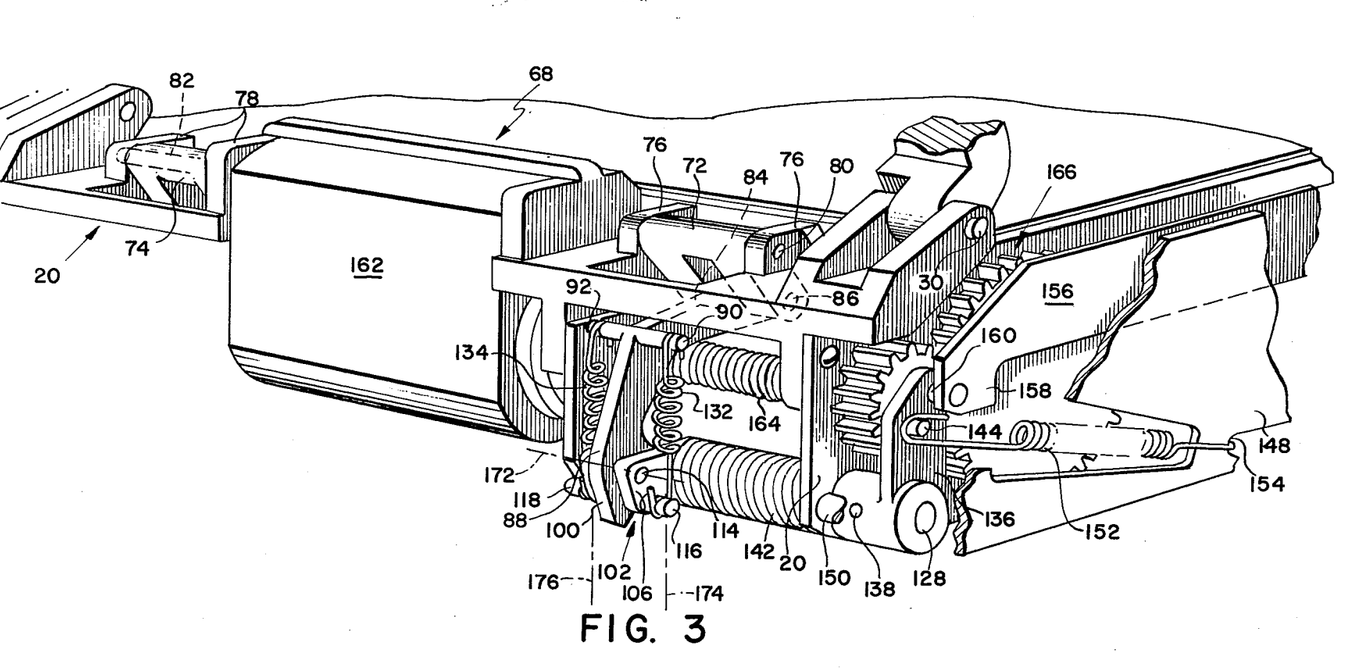
FIG. 3 provides a simplified perspective of a portion of a photographic camera of FIG. 1 illustrating the operator assembly erecting mechanism.

As best seen in FIG. 3, one end portion of the operator assembly 68 extends to a pair of spaced parallel hinge portions 72 and 74. A pair of spaced parallel support members 76 and 78 are rigidly secured to the bottom support portion 20 of the camera 10 in a well-known manner and the hinge portions 72 and 74 are pivotally secured to said support members 76 and 78, respectively, as by pin means 80 and 82, respectively.

Figure 4:
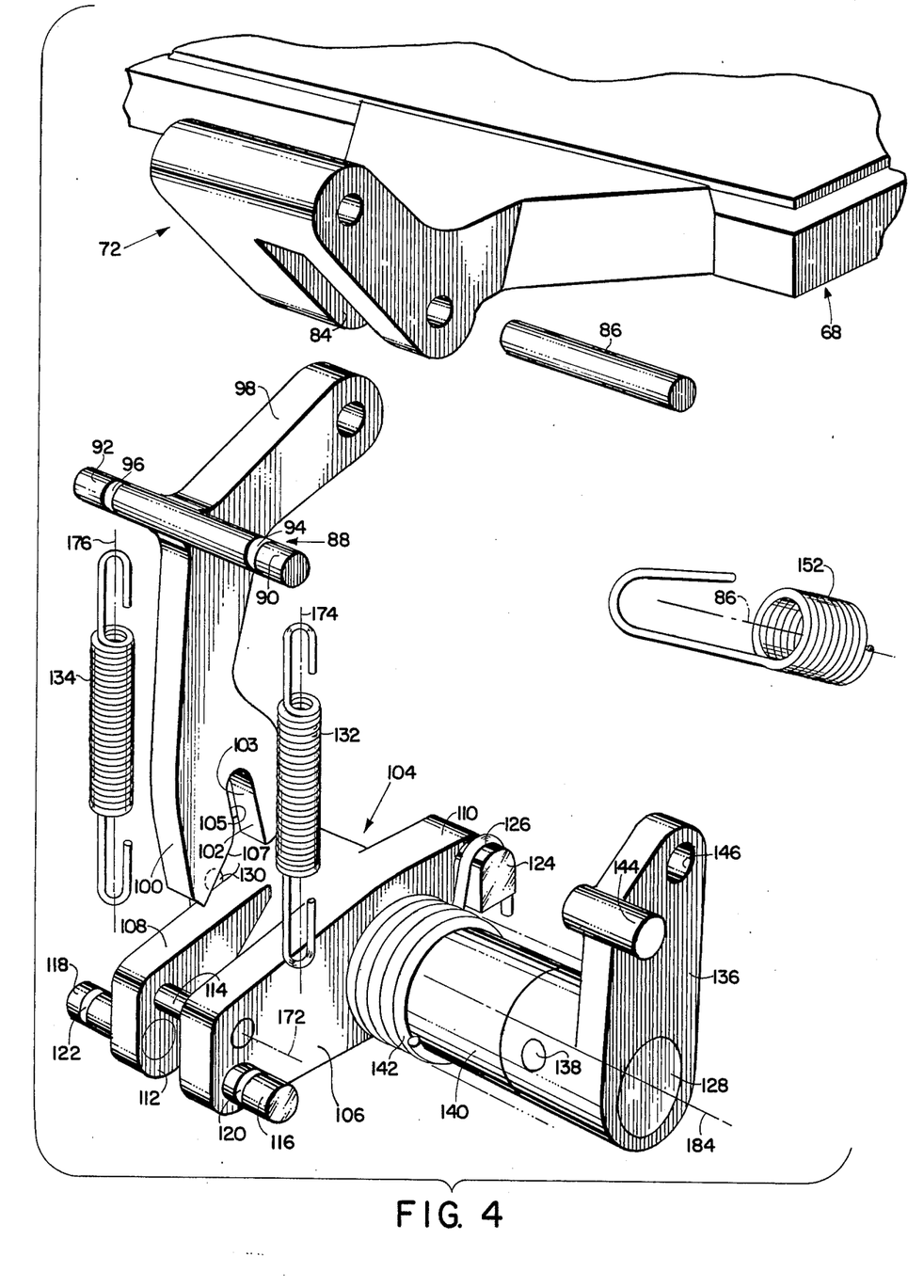
FIG. 4 provides a simplified exploded perspective of the erecting mechanism of FIG. 3.

As best seen in FIGS. 3 and 4, the hinge portion 72 of the operator assembly 68 includes a centrally located slot 84 and is adapted to secure a pin 86 which extends transversely through the slot 84 in spaced parallel relation to the pin means 80. The hinge portion 72 forms one of the elements of a four bar linkage assembly by which the operator assembly 68 may be driven between its viewing mode and exposure mode positions. A generally "elbow"-shape draw-down link 88 forms a second element of said four bar linkage and is provided with a pair of coaxial oppositely directed lugs 90 and 92 which extend transversely thereof and are provided with neck portions 94 and 96, respectively. The link 88 extends to an end portion 98 which is partially received within the slot 84 and pivotally secured to the hinge portion 72 as by said pin 86. The draw-down link 88 extends to a bifurcated end portion 100 having an open-ended generally U-shape slot 102 which is defined by an inner face 103 and a ramp surface 105 which extends to a dwell portion 107.

The third element of the four bar linkage assembly is provided by a bifurcated crank assembly 104 which extends in one direction to a pair of sapced parallel supports 106 and 108 and in an opposite direction to an end portion 110. The spaced parallel supports 106 and 108 define a slot 112 therebetween, and a pin 114 extends across said slot 112 between the supports 106 and 108. A pair of oppositely directed lugs 116 and 118 extend from the spaced parallel supports 106 and 108, respectively, and are provided with neck portions 120 and 122, respectively. A lug 124 is secured to the end portion 110 of the bifurcated crank assembly 104, extends in a direction parallel to the lug 116, and includes a neck portion 126.

The bifuracted crank assembly 104 is secured to a shaft 128 so as to rotate therewith as by a pin 130 and said shaft 128 is rotatably secured to the bottom support portion 20 in a well-known manner. The bifurcated end portion 100 of the drag-down link 88 is slideably received within the slot 112 such that the U-shape slot 102 will slideably receive the pin 114. A pair of tension springs 132 and 134 maintain the elbow-shape drag-down link 88 and the bifurcated crank assembly 104 in movable engagement, as will be explained hereinafter.

The tension spring 132 is secured between the lug 90 of the drag-down link 88 and the lug 116 of the bifurcated crank assembly 104 in a well-known manner with one end portion of said tension spring 132 disposed within the neck portion 94 and the other end portion of said tension spring 132 disposed within the neck portion 120. In like manner, the tension spring 134 is secured between the lug 92 and the lug 118 with one end portion of said tension spring 134 disposed within the neck 96 and the opposite end portion of said spring 134 disposed within said neck 122.

The fourth element of said four bar linkage assembly is provided by the frame or bottom support portion 20 of said photographic camera 10 and said four bar linkage assembly functions in a manner to be described in more detail infra.

As best seen in FIGS. 3 and 4, a crank 136 is fixedly secured to one end portion of said shaft 128 as by a pin 138. A sleeve 140 is positioned on said shaft 128 and is disposed between a portion of said support portion 20 and the support 106 of said bifurcated crank assembly 104. A torsion spring 142 is wound about the sleeve 140 with one end portion of said spring 142 disposed about the neck portion 126 of the lug 124 and the oppositely directed end portion (not shown) of said spring 142 secured to said bottom support portion 20 in a well-known manner. The torsion spring 142 is preloaded and, as best seen in FIG. 3, said spring 142 is so wound as to unwind in a clockwise direction so as to effect clockwise movement of the crank assembly 104 with the shaft 128 (looking into FIG. 3).

The crank 136 is provided with a lug 144 a predetermined radial distance from the axis of rotation of the shaft 128 and is further provided with an opening 146 in its end portion remote from said shaft 128. A a support plate 148 is secured in spaced parallel relation to a portion of the bottom support portion 20 as by a plurality of spacer bars, one of which is partially illustrated at 150. A preloaded tension spring 152 is connected at one end portion to the support plate 148 as at 154 and at its other end portion to the lug 144 in a well-known manner. A ram 156 forms a component of a kinematic linkage assembly illustrated generally at 157 (FIG. 1) and extends to an end portion 158 having a lug 160 which is pivotally secured to the crank 136 via the opening 146. An electric motor 162 is connected via a spring clutch assembly 164 to a gear train 166, said gear train 166 being operatively connected to said kinematic linkage assembly and, hence, said ram 156. The motor 162 may typically be powered by a battery which may be supplied with the film-laden cassette structure 22 in a well-known manner and functions to drive the crank 136 via the ram 156 of the kinematic linkage assembly 157 and the gear train 166 in a manner more fully described in U.S. Pat. No. 3,714,879, issued on Feb. 6, 1973, to E. H. Land et al., and commonly assigned herewith.

Referring again to FIG. 2, the operator assembly 68 is shown in phantom both when in the exposure mode position at 168 and at a position 170 intermediate the exposure mode and viewing mode positions. With the operator assembly 68 in the position 168 and at the completion of an exposure, electrical switches (not shown) within the photographic camera 10 are activated to energize the motor 162. The motor 162 will drive the gear train 166 via the spring clutch assembly 164 which, in turn, will drive the ram 156 via the kinematic linkage 157 toward the rear wall portion 24 of the camera 10 so as to rotate the crank 136 in a counterclockwise direction (looking into FIG. 3). Counterclockwise rotation of the crank 136 will be transmitted through the shaft 128 to the bifurcatd crank assembly 104 which, in turn, will wind up the torsion spring 142 by means of the connection between the lug 124 and one end portion of said torsion spring 142, as aforesaid. Such counterclockwise rotation of the crank 136 will also extend the preloaded tension spring 152 so as to increase the energy stored thereby. The tension springs 132 and 134 will cause the drag-down link 88 to move with the bifurcated crank assembly 104 and exert a force on the pin 86 causing the hinge portions 72 and 74 and, hence, the operator assembly 68 to rotate clockwise about the pin means 80 and 82, toward the viewing mode position illustrated in solid line in FIG. 2.

After the operator assembly 68 has assumed the viewing mode position of FIG. 2, capping the film-laden cassette structure 22, the motor 162 will continue running for a predetermined time interval to further store energy in the torsion spring 142 and the tension spring 152. It should be noted at this point that when the operator assembly 68 reaches the viewing mode position of FIG. 1, the pin 114 of the bifurcated crank assembly 104 will be in abutment with the closed end portion of the U-shape slot 102 of the drag-down link 88.

Figure 8:
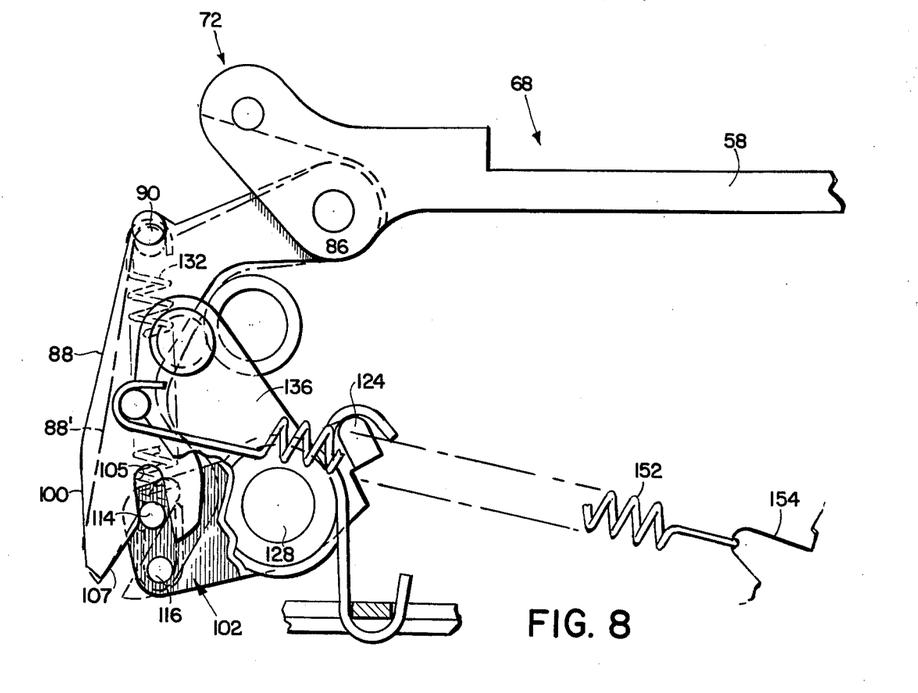
FIG. 8 provides a simplified representation of the relative position of all of the components illustrated in FIG. 7 when the erecting mechanism is in the override position.

As the motor 162 continues to run for a predetermined interval following the reaching of the viewing mode position by the operator assembly 68, the bifurcated crank assembly 104 will continue its counterclockwise rotation, causing the pin 114 to move along the ramp surface 105 of the U-shape slot 102, toward the open end thereof. Such motion of the bifurcated crank assembly 104 will cause the lugs 116 and 118 to move away from the lugs 90 and 92, respectively, so as to stretch the tension springs 132 and 134 and increase the energy stored thereby. The increased loading of the tension springs 132 and 134 will exert a clockwise torque on the operator assembly 68 (about the pins 80 and 82) to insure that the operator assembly 68 is fully seated and secured in the viewing mode position against inadvertent movement. The positions of the component portions of the four bar linkage assembly when the operator assembly 68 is in the viewing mode position and the motor 162 has driven the pin 114 toward the open end of the slot 102, may be designated as the "override position" and is illustrated in FIGS. 3 and 8.

When the operator assembly 68 is in the viewing mode position and the components of the four bar linkage assembly are in the override position, as aforesaid, (FIGS. 3 and 8), the longitudinal axis 172 of the pin 114 lies proximate the plane defined by the longitudinal axes 174 and 176 of the tension springs 132 and 134, respectively.

After the camera 10 is properly focused with respect to the desired subject, a photographic cycle is commenced by depression of a shutter release button (not shown) mounted upon the photographic camera 10. After the shutter release button is depressed, the tension spring 152 and the torsion spring 142 will exert a clockwise torque on the shaft 128, causing the bifurcated crank assembly 104 to rotate clockwise until the pin 114 has seated in the closed end portion of the U-shape slot 102. Further clockwise rotation of the crank 104 will cause the drag-down link 88 to exert a torque on the operator assembly 68 about the pins 80 and 82 via the pin 86. The driving torque exerted on the operator assembly 68 by the drag-down link 88 will be counterclockwise (looking in the direction of FIG. 1) so as to pivot the operator assembly 68 upward to the exposure mode position 168.

Figure 5:
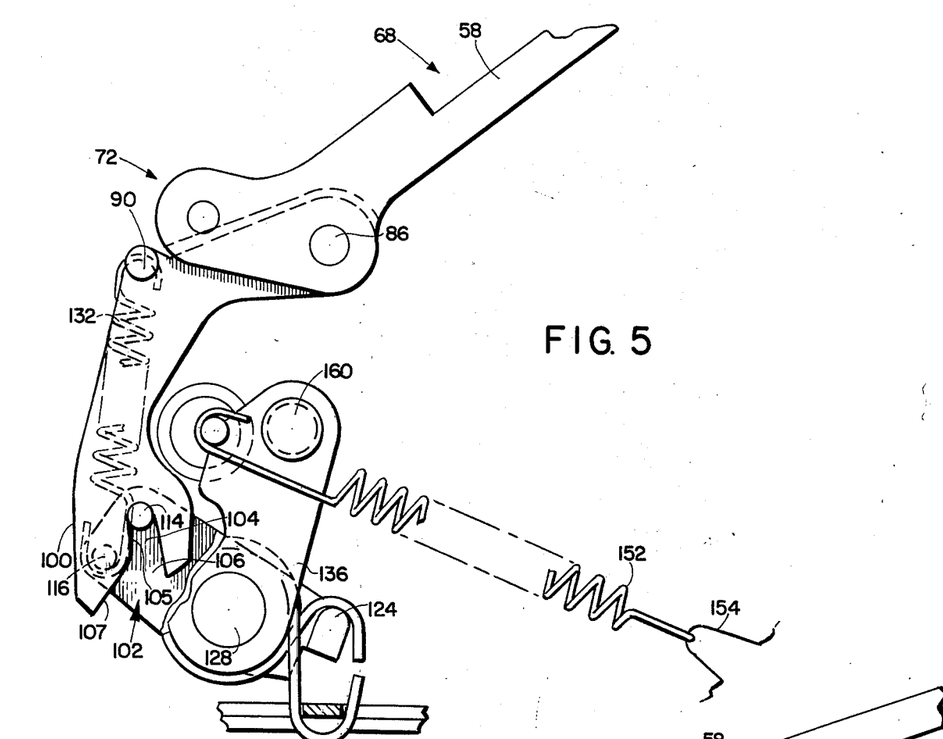
FIG. 5 provides a simplified functional representation of the operator assembly and erecting mechanism of FIG. 2 whilst said operator assembly is in the exposure mode position.
Figure 6:
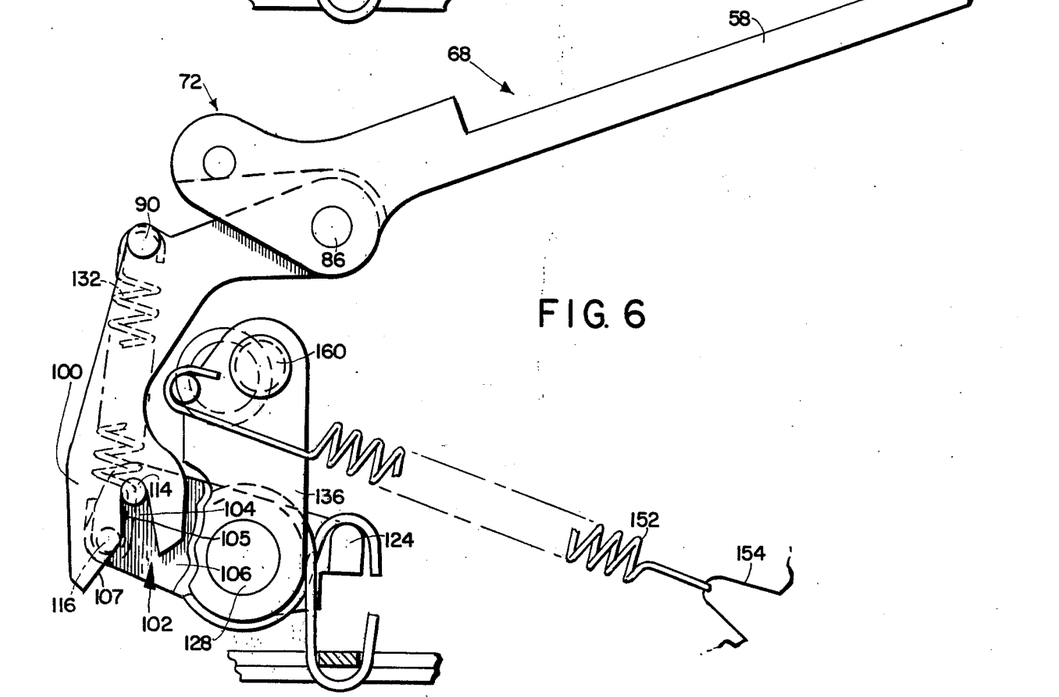
FIG. 6 provides a simplified schematic of the components of FIG. 5 when the operator assembly has moved part way toward the viewing mode position.
Figure 7:
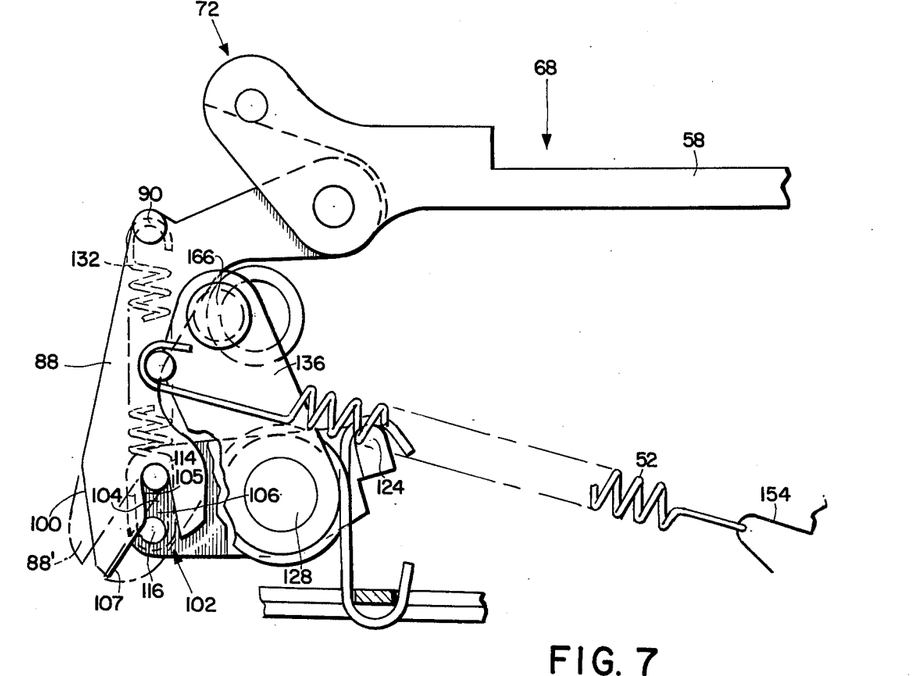
FIG. 7 illustrates the components of FIG. 5 when the operator assembly has just reached the viewing mode position and further compares a portion of the novel assembly hold-down mechanism to an analogous portion of a prior art mechanism.

It should be understood that the tension springs 132 and 134 are so designed and preloaded that the energy stored thereby and, hence, the tensile force exerted between the lugs 90 and 92 and the lugs 116 and 118, respectively, will not vary appreciably as the operator assembly 68 moves from the position of FIG. 7 successively to the positions of FIGS. 6 and 5. Thus, the tension springs 132 and 134 will exert a progressively increasing (in proportion to the increasing distance between the axes 174 and 176 and the axis 172) counterclockwise torque tending to erect the operator assembly 68 to the exposure mode position as said operator assembly 68 successively moves from the position of FIG. 7 to that of FIG. 6 and finally to the fully erected position of FIG. 5. Thus, it can be seen that the tension springs 132 and 134 readily supplement the torque provided by the torsion spring 142 and the tension spring 152 in erecting the operator assembly 68 from the viewing mode position to the exposure mode position.

With the operator assembly 68 in the exposure mode position 168 (FIG. 2) and after an exposure has been completed, the electric motor 162 operates to drive the gear train 166 (via the spring clutch 164) and the gear train 166 will drive the kinematic linkage assembly 157 and, hence, the ram 156 to effect counterclockwise rotation of the crank 136 and the bifurcated crank assembly 104. Such counterclockwise movement of the bifurcated crank assembly 104 will cause the drag link 88 to pivot the operator assembly 68 clockwise (looking into FIG. 2) about the pins 80 and 82 and toward the viewing mode position.

If, during the travel of the operator assembly 68 toward the viewing mode position such movement were to become inadvertently obstructed, the tension springs 132 and 134 would function as override springs and provide a lost-motion connection between the electric motor 162 and the operator assembly 68, as more fully described in copending application Ser. No. 246,854, aforesaid.

When no obstruction is encountered by the operator assembly 68 as it is being driven toward the viewing mode position by the motor 162, said operator assembly 68 will continue its downward movement towards the viewing mode position. As the motor 162 continues to drive the operator assembly 68 toward the viewing-focusing mode position, it will wind up the torsion spring 142 via the bifurcated crank assembly 104 and extend the tension spring 152 via the increasing distance between the lug 144 and the connection 154 as the crank 136, shaft 128, and bifurcated crank assembly 104 rotate in a counterclockwise direction. After the operator assembly 68 has reached the viewing-focusing mode position, the motor 162 will continue to drive the gear train 166 and the kinematic linkage assembly 157, for a predetermined time interval, to effect further counterclockwise rotation of the crank 136 and the bifurcated crank assembly 104. Such continued movement of said bifurcated crank assembly 104 and crank 136 will wind up the torsion spring 142 until it has stored a predetermined amount of energy in the form of a predetermined initial torque delivery to the shaft 128. Similarly, the tension spring 152 will be extended to a predetermined distance or preloaded so as to deliver a predetermined initial torqiue to the shft 128. Thus, at the start of a photographic cycle (with the operator assembly 68 capping the exposure plane 46 and with the erecting assembly in the override position of FIG. 8), a predetermined combined torque will be delivered to the operator assembly 68 by the tension spring 152 and the torsion spring 142 which combined torque will remain nearly constanat as the operator assembly moves from its exposure-focusing mode configuration toward its fully erected exposure mode configuration.

Considering the instant hold-down mechanism in more detail, and referring again to FIGS. 7 and 8, the instant draw-down link 88 is illustrated in solid line superposed on a similar draw-down link of the prior art which is illustrated in phantom at 88'.

When the operator assembly 68 first reaches the viewing-focusing mode position (FIG. 7), the pin 114 will be bottomed in the closed end of the slot 102 with either the present draw-down link 88 or the prior art link 88' substituted therefore. Similarly, the distance between the lugs 116 and 118 and the lugs 90 and 92, respectively, will be the same irrespective of which of the illustrated drag-down links is utilized.

As the motor 162 continues to run and drive the bifurcated crank assembly 114 toward the override position of FIG. 8, the slot 102. In the case of the present drag-down link 88, the pin 114 will move along the ramp surface 105 which functions as a cam surface. As is readily apparent, the ramp or cam surface 105 provides two functions. Firstly, movement of the pin 114 along the surface 105 will cause the drag-down link 88 to pivot clockwise about the pin 86 to increase the extension and loading of the springs 132 and 134 over that which would occur with the link 88'.

More significantly, if we ignore frictional effects, it can be seen that in the override position the force exerted by the pin 114 on the link 88 will be normal to the surface 105. Notwithstanding the increased loading of the springs 132 and 134 with the link 88, the magnitude and direction of the force exerted by the pin 114 on the ramp surface 105 will be such as to effect a substantial increase in the hold-down torque on the operator assembly 68 (clockwise about the pins 80 and 82) provided by the link 88 and the pin 86.

The increased hold-down torque operated by the employment of the ramp surface 105 is sufficient to secure the operator assembly 68 in the viewing or focusing mode position against any inadvertent jarring and prevent a resultant light leak to the unexposed film unit.

In the event that the operator assembly 68 is restrained from its return movement from the exposure mode position to the viewing mode position, the lost-motion connection provided by the drag-down link 88 will permit the motor 162 to complete its cycle while the springs 132 and 134 store the energy which would otherwise return the operator assembly 68 to the viewing mode position. During the period in which the operator assembly 68 is restrained, the pin 114 will move along the ramp surface 105 and thence to the dwell surface 107. The dwell surface 107 serves to prevent the pin 114 and, hence, the bifurcated crank assembly 104 from disengaging from the drag-down link 88.

The attendant advantages possessed by the novel link 88 in contrast to the link 88' can best be appreciated by referring again to FIG. 9. When the link 88' is employed there is an insufficient hold-down torque generated to properly secure the operator assembly in a lighttight seal capping the film plane (in the viewing mode position) and, hence, a safety latch must be employed.

Figure 9:
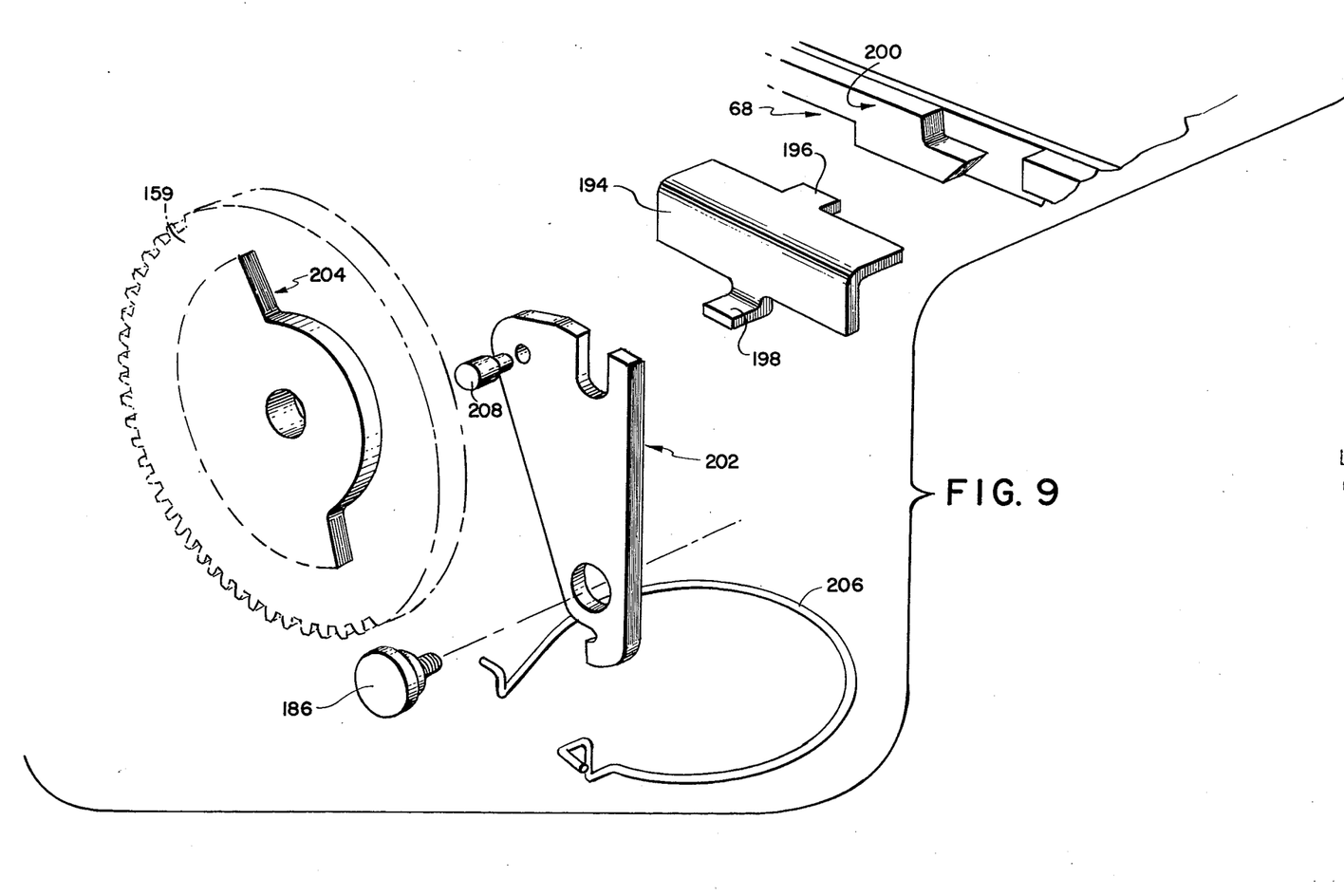
FIG. 9 provides a simplified exploded perspective of a prior art hold-down mechanism for use with a camera otherwise similar to that herein described.

As best seen in FIG. 9, the safety latch 194 includes tab portions 196 and 198. The tab portion 196 is adapted to mate with a docking assembly 200 formed integrally with an edge of the operator assembly 68.

The safety latch 194 is driven by an actuator link 202 which is pivotally secured to the frame 20 as by pin means 186. A cam 204 is secured to the inner face of a timing gear 159 incorporated within the gear train 166 and a spring 206 biases the link 202 counterclockwise (looking into FIG. 9) to maintain a cam follower 208 (which is secured to the link 202) in engagement with the cam 204.

The tab 198 is adapted to engage the link 202 and the entire mechanism functions to cyclically secure the operator assembly 68 in the viewing mode position. For a more detailed discussion of the operation of the latching mechanism of FIG. 9, reference may be had to U.S. patent application Ser. No. 222,964, filed Feb. 2, 1972, and commonly assigned herewith.

Thus, by utilizing the novel link 88 instead of the prior art link 88', the entire cam assembly 204, cam follower 208, actuator link 202, latch 194, and docking assembly 200 can be eliminated.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. In combination with a reflex photographic camera of the type having operator means movable between a viewing position and an exposure position, apparatus including:
    erecting means coupled with said operator means and actuable to move said operator means between said viewing and said exposure positions;
    actuator means driveably engageable with said erecting means for actuating said erecting means to move said operator means from one of said positions to the other of said positions;
    override means including energy storage means connected between said actuator means and said erecting means to permit relative movement between said actuator means and said erecting means upon restraint of said operator means; and
    cam means connected to said erecting means and cooperable with said actuator means to releasably secure said operator means in said viewing position against inadvertent movement.

2. The invention pursuant to claim 1, wherein said erecting means is movable between an initial position and an override position while said operator means remains in said viewing position and energy is transferred to said energy storage means.

3. The invention as recited in claim 2, wherein said actuator means includes cam follower means and said energy storage means biases said cam means into engagement with said cam follower means.

4. The invention according to claim 3, wherein said cam means is of such shape as to provide a torque biasing said operator means into said viewing position which increases as said erecting means moves toward said override position at a greater rate than the transfer of energy to said energy storage means.

5. The invention as delineated in claim 4, wherein said erecting means comprises a link arm pivotally secured at one end portion to said operator means and extending to an open-ended slot at its other end portion; one side of said slot being defined by a ramp surface.

6. The invention pursuant to claim 5, wherein said actuator means comprises a bell crank and said cam follower means is secured to said bell crank eccentric of its axis of rotation and is engageable with and slideable along said ramp surface to generate an increasing torque biasing said operator means into said viewing position.

7. The invention pursuant to claim 6, wherein said bell crank will rotate counterclockwise while said erecting means moves from said initial position to said override position and effect counterclockwise rotation of said link arm.

* * * * *